United States Patent
Biskeborn

(10) Patent No.: US 7,898,760 B2
(45) Date of Patent: Mar. 1, 2011

(54) MAGNETIC SPACING AND TAPE CHARACTERISTIC COMPENSATION SYSTEM AND METHOD

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 1141 days.

(21) Appl. No.: 11/560,281

(22) Filed: Nov. 15, 2006

(65) Prior Publication Data

US 2008/0112076 A1 May 15, 2008

(51) Int. Cl.
*G11B 5/035* (2006.01)
(52) U.S. Cl. .................. 360/65; 360/31; 360/60; 360/75; 360/77.13
(58) Field of Classification Search .......................... None
See application file for complete search history.

(56) References Cited

U.S. PATENT DOCUMENTS

| | | | | |
|---|---|---|---|---|
| 5,455,717 A | * | 10/1995 | Van Doorn et al. | 360/6 |
| 6,493,174 B1 | * | 12/2002 | Stubbs | 360/77.12 |
| 7,027,250 B2 | * | 4/2006 | Lau | 360/69 |
| 2003/0058559 A1 | * | 3/2003 | Brand et al. | 360/31 |

* cited by examiner

*Primary Examiner* — Jason C Olson
(74) *Attorney, Agent, or Firm* — Zilka-Kotab, PC

(57) ABSTRACT

A magnetic head according to one embodiment includes a reader and a thermal sensor for detecting a thermal effect thereon from a magnetic medium passing by the thermal sensor. A tape drive system according to one embodiment includes a magnetic head for reading data from a magnetic tape, a thermal sensor for detecting a thermal effect thereon from the magnetic tape passing by the thermal sensor, a drive mechanism for passing the tape over the head, and a processor for causing alteration of a readback signal from the magnetic head based on an output of the thermal sensor.

20 Claims, 9 Drawing Sheets

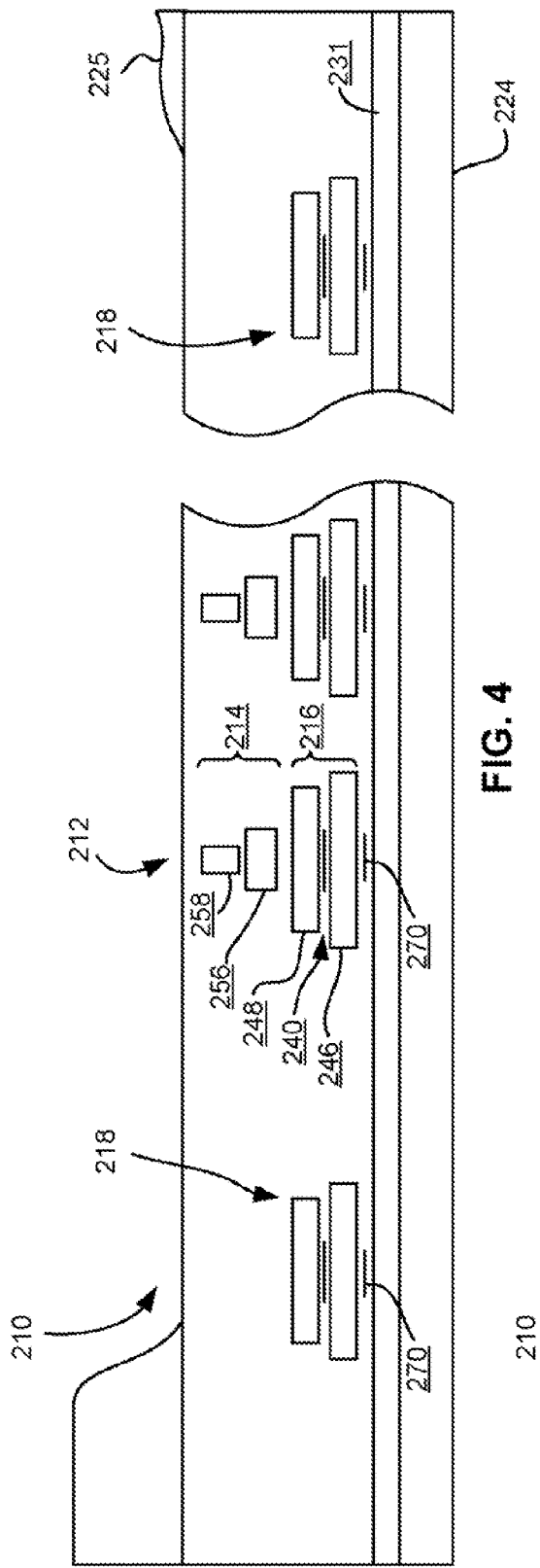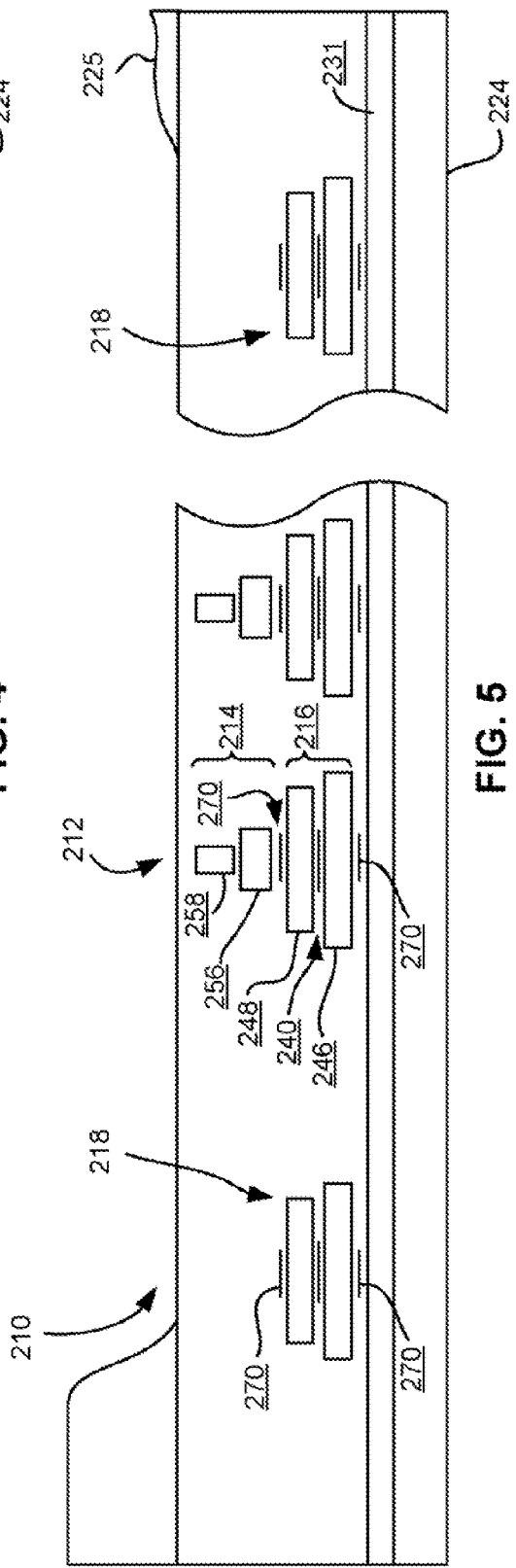

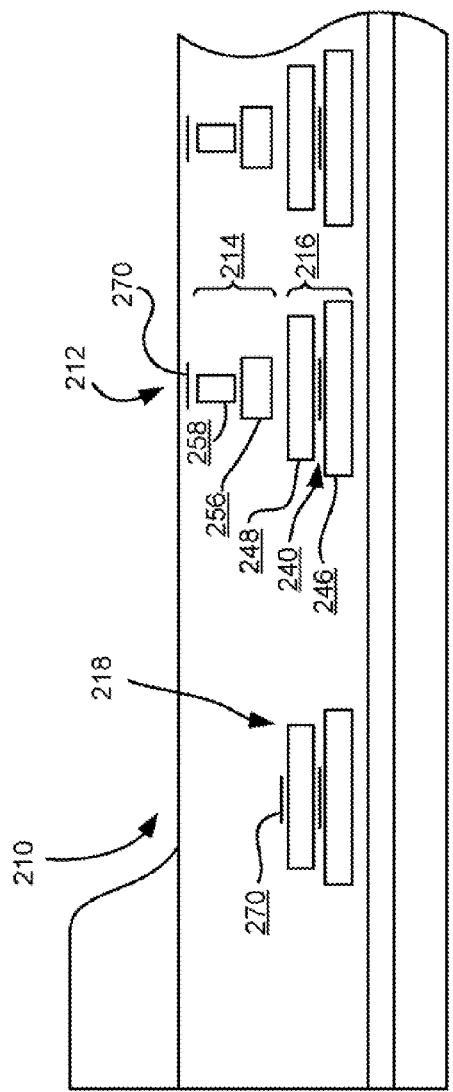
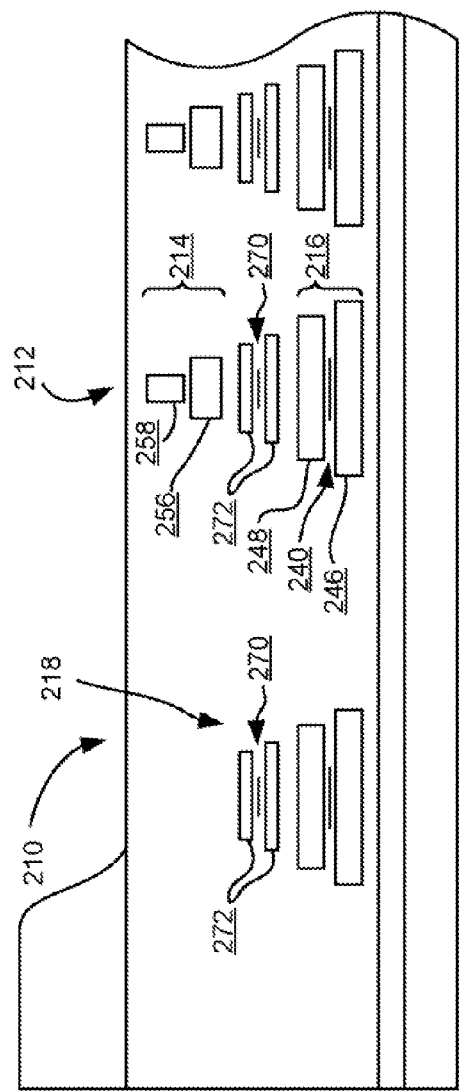
FIG. 6
FIG. 7

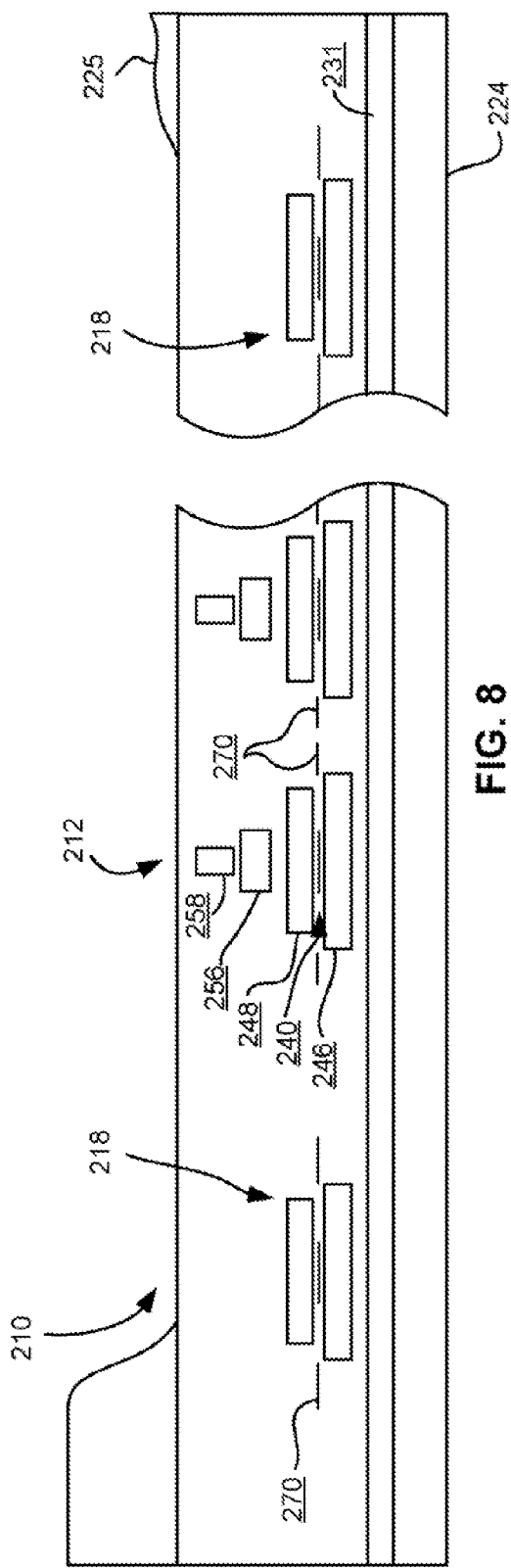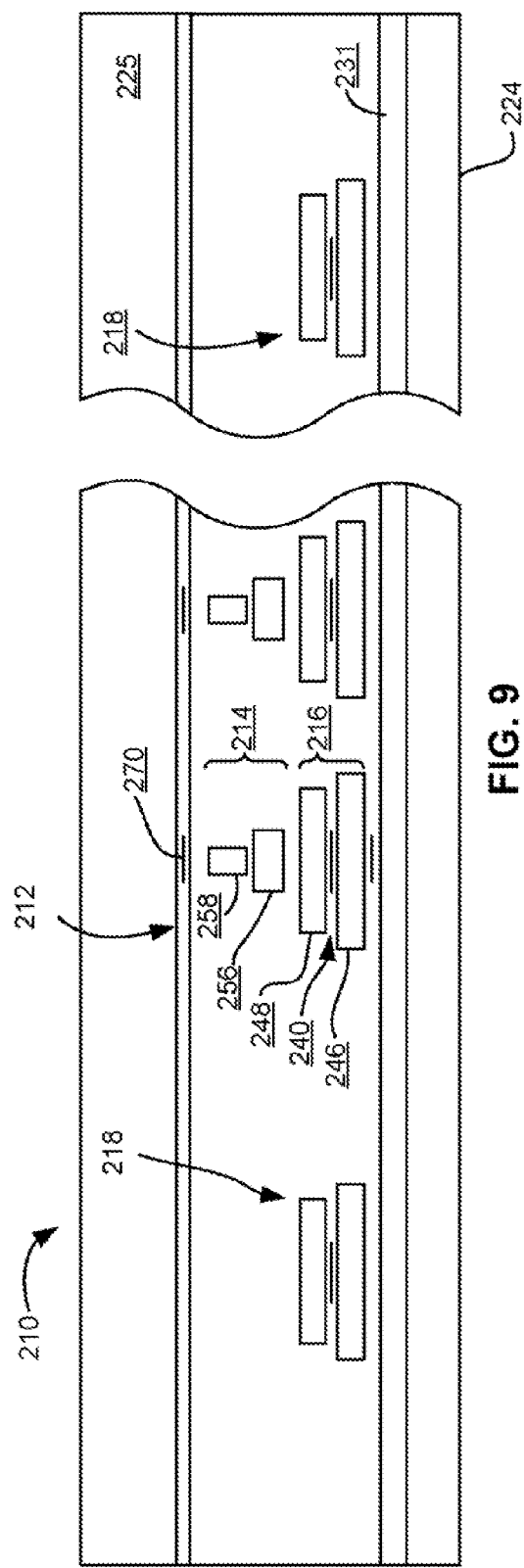

MAGNETIC SPACING AND TAPE CHARACTERISTIC COMPENSATION SYSTEM AND METHOD

FIELD OF THE INVENTION

The present invention relates to data storage systems, and more particularly, this invention relates to a system and method for adjusting readback signal processing based on detecting changes in physical characteristics of the tape and/or variations in head-tape spacing.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. Later sensors using the GMR effect were developed. AMR and GMR sensors transduce magnetic field changes to resistance changes, which are processed to provide digital signals. Data storage density can be increased because AMR and GMR sensors offer signal levels higher than those available from conventional inductive read heads for a given read sensor width and so enable smaller reader widths and thus more tracks per inch. Moreover, the sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

As shown in FIG. 1A, a magnetic recording tape 100 typically includes a polymeric substrate layer 102, an underlayer 104, and a layer of magnetic particles (magnetic layer) 106. During writing, the magnetic moments of the individual particles in the magnetic layer 106 are oriented to represent data encoding. During readback, as the magnetic medium passes over an MR sensor, the readback signal from the MR sensor reflects a change in resistance of the MR sensor due to the influence of the magnetic medium thereon.

Readback signals are less likely to produce errors when the magnetic transitions on the tape 100 are sharp. For a given linear density, the thicker the magnetic layer 106, the deeper into the magnetic layer 106 the transitions are recorded. The result is transitions that are not sharp, i.e., the transitions have larger transition parameters, a, and broader $pw_{50}$, and tis in turn can increase error rate. Deep-positioned transitions are also harder to overwrite. Accordingly, a very thin magnetic layer 106 has been found to provide the sharpest magnetic transitions. The layer of magnetic particles on modern tapes is approximately 0.1 micron thick or less.

Thus, in modern tapes, the substrate layer 102 (e.g., 7 microns thick) is significantly thicker than the magnetic layer 106. The underlayer 104 and magnetic layer 106 may be coextruded onto the substrate layer 102. The substrate layer 102 has a surface texture that is nonuniform, i.e., has asperities and other irregularities that provide surface roughness to enable reliable movement of the web through the coater. The underlayer 104 acts as a filler layer that smooths out the rough surface of the substrate layer 102. However, the coating process is not perfect, and the underlayer 104 will have an uneven upper surface which translates to the thin magnetic layer 106. Thus, after calendaring, which in part tends to make the top tape surface very smooth, the magnetic layer 106 will have areas that are thicker than others, e.g., at A, and/or will have an uneven surface, e.g., at B, which affects head-medium spacing at both A and B. In addition, agglomerations of magnetic particles are often found in the magnetic layer 106. FIGS. 1B-1E illustrate various types of asperities commonly found in the magnetic layer 106. The tape surface is shown relative to a magnetic head 150.

Magnetic recording systems suffer from Signal to Noise Ratio (SNR) degradation due to changes in signal readback amplitude due to magnetic layer irregularities, which themselves are the result of the particle agglomerations and magnetic coating thickness variations. In particular, the amplitude of the readback signal generally increases over agglomerations of magnetic particles as well as where the head-tape spacing is reduced. This variation in amplitude may increase error rate during readback signal processing.

During processing of the readback signal, the readback signal is amplified, and the amplified readback signal is processed by a detector that attempts to identify the locations of the magnetic transitions on the readback signal. There are two common approaches to analyze the readback signal. The first approach, peak detection, analyzes peak levels of the readback signal. A second approach, Partial Response Maximum Likelihood (PRML), compares the readback signal to amplitude bins or thresholds, and determines whether there is a transition based on the level and the timing of the level. While peak detection is not highly level dependent, PRML detection is very level dependent. PRML looks for signatures in the signal, and the signal characteristics must fall within a certain band or the transitions will be misdetected. When an agglomeration of magnetic particles passes by an MR head, the amplitude of the readback signal will increase dramatically. Similarly, where the magnetic layer protrudes outwardly towards the head, whether due to the agglomeration itself, or to underlayer thickness variations or a rough area on the substrate layer, the amplitude of the readback signal will increase due to the reduced head-tape spacing. The resultant amplitude shifts cause errors during peak detection and PRML detection. There are no prior known solutions to this problem.

SUMMARY OF THE INVENTION

The present invention addresses signal detection degradation due to intermittent and frequent changes in signal readback amplitude due to irregularities in the magnetic layer, which themselves may be the result of particle agglomerations and underlayer thickness variations, and/or due to transient changes in head/medium spacing due to variations in the top surface topography, which in turn may be caused by magnetic particle agglomerations. A magnetic head according to one embodiment includes a reader and a thermal sensor for detecting a thermal effect thereon from a magnetic medium passing by the thermal sensor.

A tape drive system according to one embodiment includes a magnetic head for reading data from a magnetic tape, a thermal sensor for detecting a thermal effect thereon from the magnetic tape passing by the thermal sensor, a drive mechanism for passing the tape over the head, and a processor for altering or causing alteration of a readback signal from the magnetic head based on an output of the thermal sensor.

A tape drive system according to yet another embodiment includes a magnetic head for writing data to a magnetic tape, a thermal sensor for detecting a thermal effect thereon from a magnetic tape passing by the thermal sensor, a drive mechanism for passing the tape over the head, and a processor for altering a write signal sent to the magnetic head based on an output of the thermal sensor.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

FIG. 4 is a representative tape bearing surface view of a multitrack head having a multitude of R/W pairs in a piggyback configuration and a thermal sensor positioned below the reader according to one embodiment of the present invention.

FIG. 5 is a representative tape bearing surface view of a multitrack tape head having a multitude of R/W pairs in a piggyback configuration and a thermal sensor positioned both above and below the reader according to one embodiment of the present invention.

FIG. 6 is a representative tape bearing surface view of a multitrack tape head having a multitude of R/W pairs in a piggyback configuration and a thermal sensor positioned above each writer according to one embodiment of the present invention.

FIG. 7 is a representative tape bearing surface view of a multitrack tape head having a multitude of R/W pairs in a piggyback configuration and thermal sensors with shields according to one embodiment of the present invention.

FIG. 8 is a representative tape bearing surface view of a multitrack tape head having a multitude of R/W pairs in a piggyback configuration and thermal sensors offset from the readers according to one embodiment of the present invention.

FIG. 9 is a representative tape bearing surface view of a multitrack tape head having a multitude of R/W pairs in a piggyback configuration and thermal sensors positioned between the R/W pairs and the closure according to one embodiment of the present invention.

BEST MODE FOR CARRYING OUT THE INVENTION

Figure 1A:
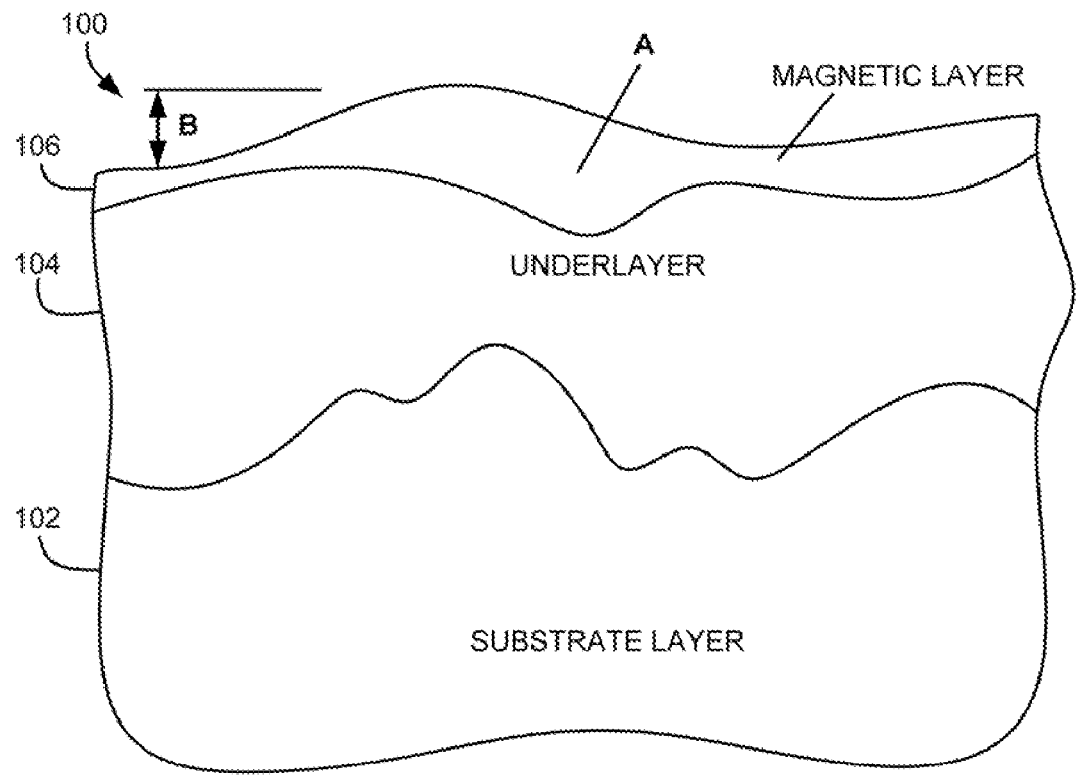
FIG. 1A is a partial side view of a magnetic recording tape.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The present invention addresses signal detection degradation due to intermittent and frequent changes in signal readback amplitude due to irregularities in the magnetic layer, which themselves may be the result of particle agglomerations and underlayer thickness variations and which can produce both magnetic spacing and magnetic intensity transient variations at the read head. Embodiments of the present invention include systems and methods for detecting irregularities in the magnetic layer of the tape and adjusting readback signal processing to account for the amplitude shift that will occur in the readback signal due to such irregularities. Particularly, a thermal sensor is used to detect the irregularities of the tape. Irregularities such as particle agglomerations act as a heat sink when passing by the thermal sensor, thereby lowering its temperature in a detectable way. Similarly, closer head-tape spacing due to either particle agglomerations, underlayer protrusions, or both results in a cooling of the thermal sensor. The output of the thermal sensor may thus be used to adjust the readback signal processing.

It should be noted that while much of the following description is presented in terms of a magnetic storage system having a R/W head in a piggyback configuration, the teachings herein are applicable to other types of magnetic data systems including those implementing interleaved heads.

Figure 2:
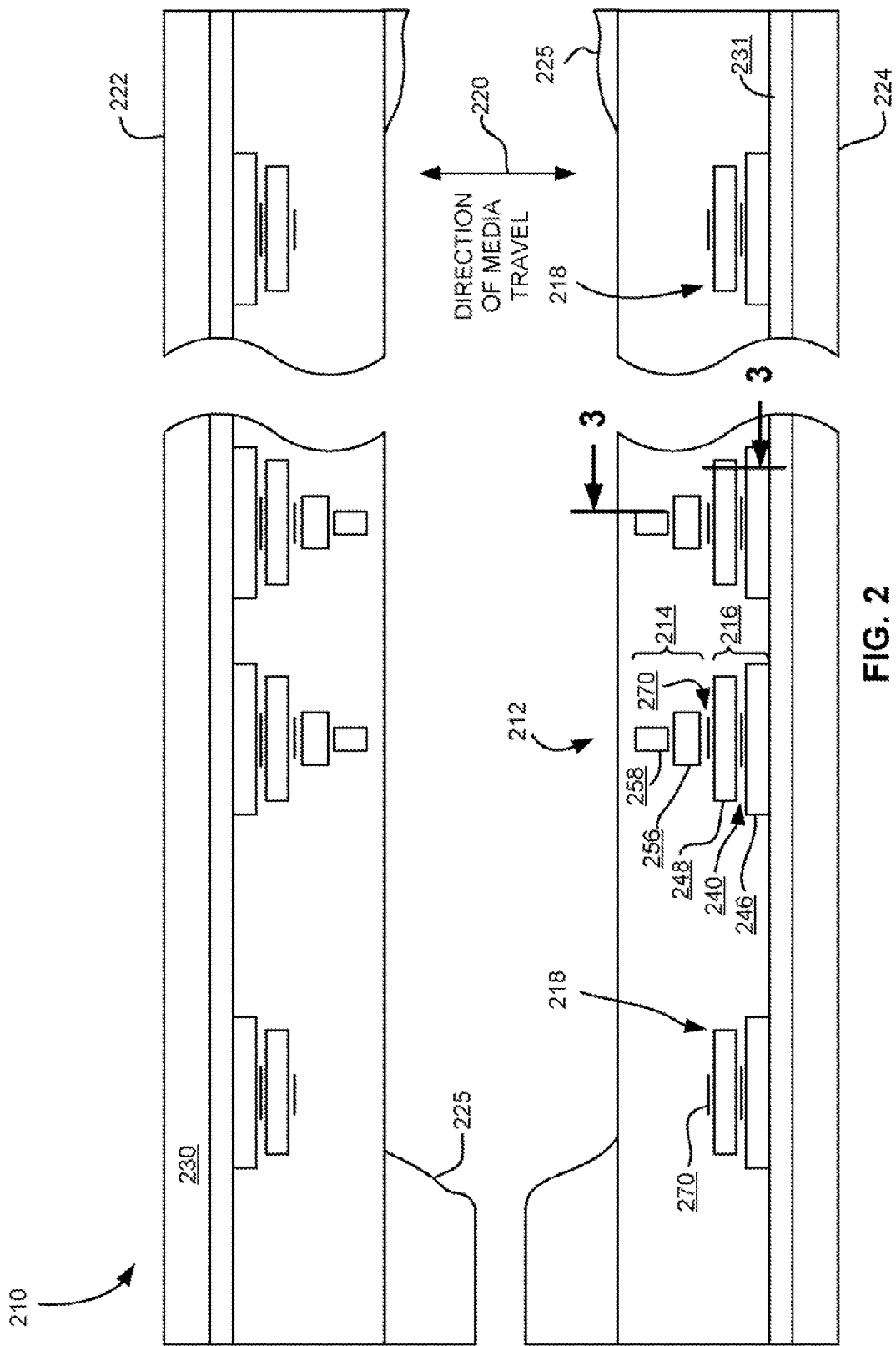
FIG. 2 is a representative tape bearing surface view of a multitrack tape head having a multitude of R/W pairs in a piggyback configuration and a thermal sensor positioned above the reader according to one embodiment of the present invention.

FIG. 2 shows the tape bearing surface (TBS) of an embodiment of a magnetoresistive (MR) head assembly 210 having a plurality of R/W pairs in a piggyback configuration formed on a common substrate 230. Thermal sensors 270 are also formed above the substrate 230, the operation and significance of which are described in detail below. The writers, exemplified by the write head 214 and the readers, exemplified by the read head 216, are aligned parallel to a direction of travel of a tape medium thereacross to form a R/W pair, exemplified by the R/W pair 212. Several R/W pairs 212 may be present, such as 8, 16, 32 pairs, etc. The R/W pairs 212 as shown are linearly aligned in a direction generally perpendicular to a direction of tape travel thereacross. However, the pairs may also be aligned diagonally, staggered, in a V-shape, etc. Servo readers 218 are generally positioned on the outside of the array of R/W pairs, the function of which is well known.

Generally, the magnetic tape medium moves in either a forward or reverse direction as indicated by arrow 220. The magnetic tape medium and head assembly 210 operate in a transducing relationship in the manner well-known in the art.

The piggybacked MR head assembly 210 includes two thin-film modules 222 and 224 of generally identical construction. Modules 222 and 224 are joined together with a space or gap present between closures 225 thereof (partially shown) to form a single physical unit to provide read-while-write capability by activating the writer of the leading module and reader of the trailing module aligned with the writer of the leading module parallel to the direction of tape travel relative thereto.

When a module 222, 224 of a piggyback head 210 is constructed, layers are formed on an electrically conductive substrate 230, e.g., of AlTiC, in generally the following order for the R/W pairs 212: an insulating layer 231, a first shield 246 typically of an iron alloy such as NiFe (permalloy), CZT or Al—Fe—Si (Sendust), a sensor 240 for sensing a data track on a magnetic medium, a second shield 248 typically of a nickel-iron alloy (e.g., 80/20 Permalloy), thermal sensor 270, first and second writer pole tips 256, 258, and a coil (not shown). The first and second writer poles 256, 258 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3:
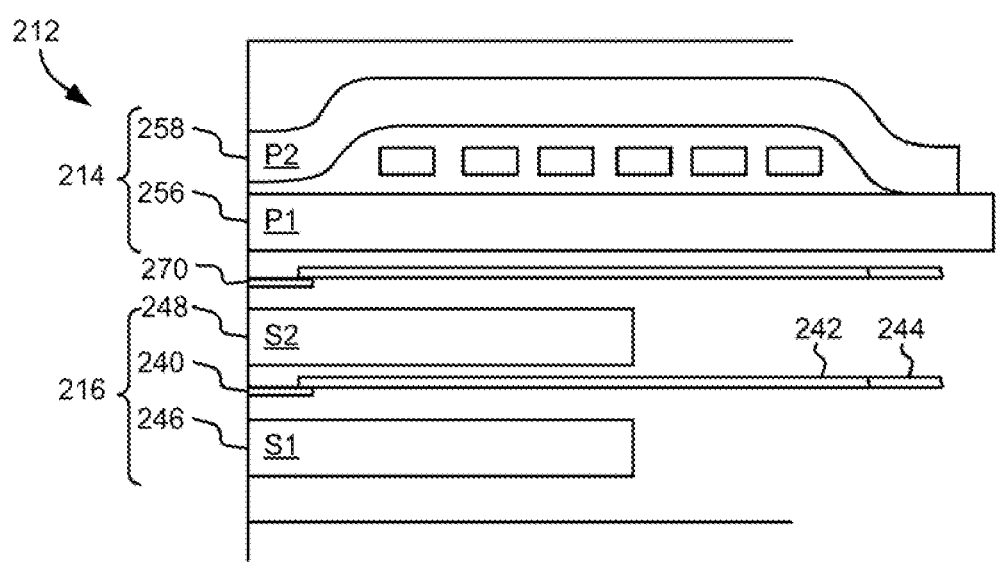
FIG. 3 is a partial cross sectional view taken from Line 3-3 of FIG. 2.
Figure 1B:
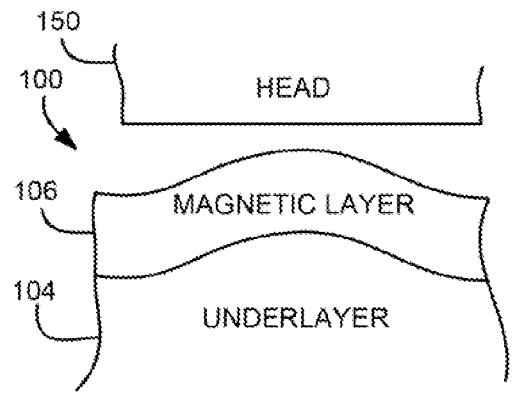
FIGS. 1B-E are partial side views of common asperities found on magnetic tape.
Figure 1C:
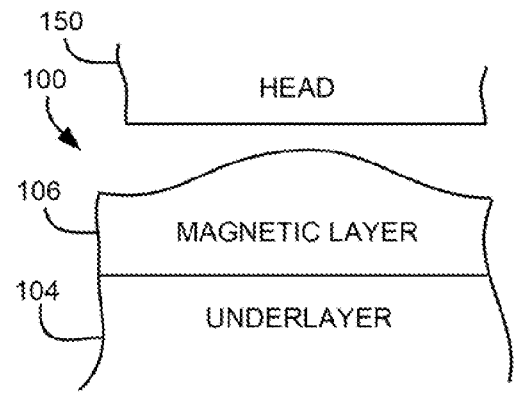
Figure 1D:
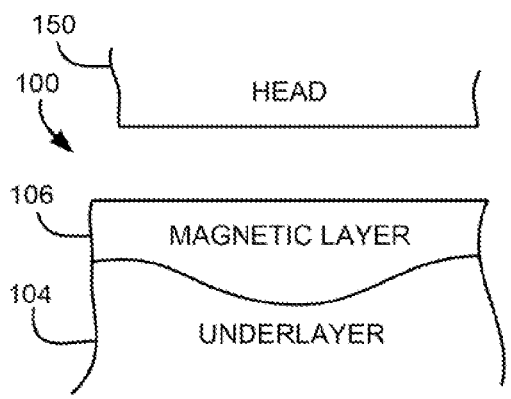
Figure 1E:
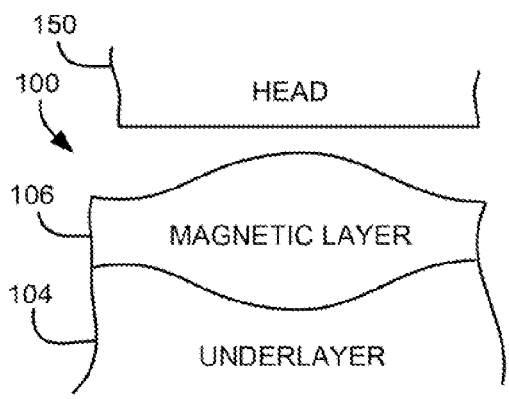

FIG. 3 represents in detail a portion of module 224 from FIG. 2, including portions of an exemplary R/W pair 212 and thermal sensor 270. The thin-film elements shown in FIG. 3 are illustrated showing submicron detail in the usual manner and are not to scale. The reader 216, which may be a magnetoresistive (MR) sensor element 240 (e.g., GMR, AMR, MTJ, etc.) is disposed between the two shields 246 and 248 (S2 & S1), with each MR sensor end coupled to an electrical lead conductor 242 and 244

FIG. 4 illustrates a variation of the head assembly 210 of FIG. 2, where a thermal sensor 270 is positioned below each reader 216.

FIG. 5 illustrates a combination of the head assemblies 210 of FIGS. 2 and 4, where a thermal sensor 270 is positioned both above and below the reader 216.

FIG. 6 illustrates a variation of the head assembly 210 of FIG. 2, where a thermal sensor 270 is positioned above each writer 214.

FIG. 7 illustrates a variation of the head assembly 210 of FIG. 2, where shields 272 surround each thermal sensor 270. In addition, a single shield may be used. The shield or shields can be designed to influence the thermal response characteristics of the thermal sensor by thermally insulating the thermal sensor 270 from upper and lower portions of the head, etc.

FIG. 8 depicts yet another embodiment where thermal sensors 270 are not only offset the MR sensors 240 in the tape travel direction 220, but implemented in the same plane as the MR sensors 240. The misalignment of the sensors 240, 270 is advantageous in that the thickness of the R/W pair is not increased and also in that the magnetic and thermal responses are coincident.

Note that the thermal sensor described above is integral to the head. Other embodiments of the present invention include a thermal sensor that is not integral to the head, but is rather formed separately and coupled thereto. For example, FIG. 9 illustrates an embodiment of the present invention where the thermal sensors 270 are positioned between the R/W pair 212 and the closure 225. In other embodiments, the thermal sensors may be positioned on the outer end of the closures, on the bottom of the substrate, or even mounted separately from the module or head. Multiple thermal sensors may also be used.

The thermal sensor may be any type of temperature-responsive device, including a temperature-sensitive resistor, thermocouple, etc. A preferred embodiment implements a tantalum read-like structure. In this illustrative embodiment, the tantalum structure does not respond to magnetic flux changes on the tape. It can be biased and monitored in a manner similar to the way a conventional reader is biased and monitored.

To maximize sensitivity, the thermal sensor may be heated above the ambient temperature. The nominal operating temperature of the thermal sensor may depend on the type of tape being used, ambient temperature, etc. In general, the operating temperature of the thermal sensor should be high enough to allow detection of surface irregularities on an AC or DC erased portion or the tape, and will generally be greater than a nominal operating temperature of the accompanying reader. Heating may be induced as a byproduct of the sensing current passing therethrough, a heating element may be provided, etc.

The thermal sensor responds to the thermal profile of the head-tape interface. Accordingly, when a large agglomeration of magnetic particles passes over the head, the thermal sensor detects a cooling event, i.e., a transient reduction in temperature due to the closer contact and/or increased mass of magnetic material passing thereby. By measuring this change in temperature, the system can estimate that the MR readback signal will be larger or smaller than expected. The gain of the readback signal can be adjusted accordingly.

The amplitude and duration of the cooling event are analyzed and may be converted into an amplitude correction factor for the magnetic signal. Then, when the MR sensor detects an abnormally high signal amplitude due to the agglomeration or closer spacing, the MR readback signal can be adjusted according to the amplitude correction factor.

Note that the tape may have nonmagnetic asperities thereon, that cause the output of the thermal sensor to spike. In preferred embodiments, if the output of the thermal sensor resembles a predefined signal response for a nonmagnetic tape asperity, the system may take no additional corrective action (aside from the actions mentioned elsewhere herein).

Figure 10:
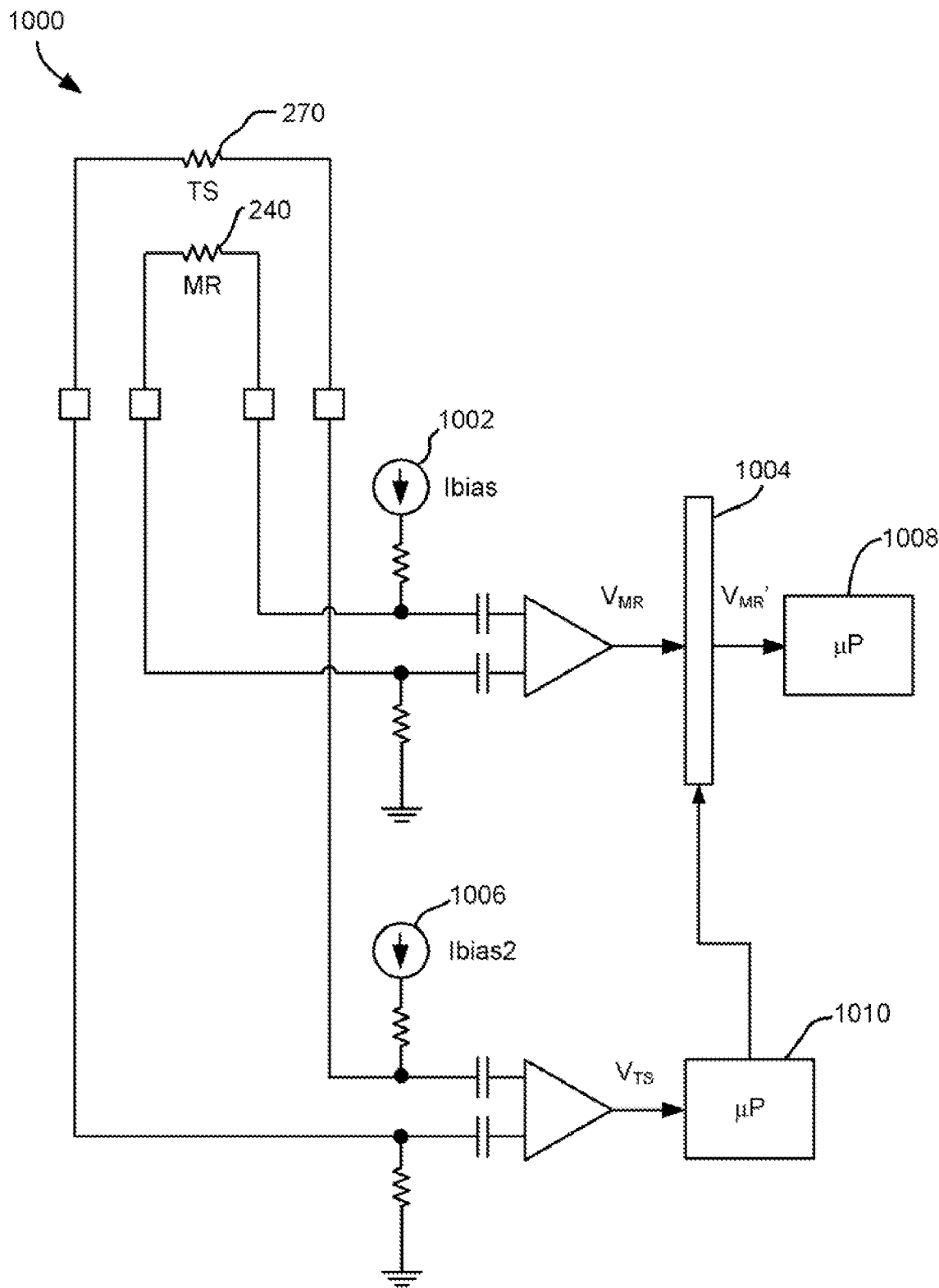
FIG. 10 is a circuit diagram of a data storage system according to one embodiment of the present invention.

FIG. 10 shows a circuit 1000 that may be used in the context of the present invention. As shown, a current source 1002 causes a biasing current to pass through the MR sensor 240. A readback signal $V_{MR}$ from the MR sensor 240 is passed to an amplifier 1004 for amplitude correction. The amplified signal $V_{MR}'$ is then processed by signal processing circuitry 1008, typically performing peak detection or PRML detection on the signal $V_{MR}'$.

With continued reference to FIG. 10, a second current source 1006 causes a biasing current to pass through the thermal sensor 270. An output signal $V_{TS}$ from the thermal sensor 270 is generated. A dedicated or nondedicated processor 1010, which may be part of the data storage system or external thereto, causes alteration of the readback signal $V_{MR}$ based on the output $V_{TS}$ from the thermal sensor 270.

In a simple embodiment, the gain of the readback amplifier 1004 is adjusted in proportion to the output $V_{TS}$ of the thermal sensor 270. For instance, if the output $V_{TS}$ of the thermal sensor 270 indicates a temperature decrease, the amplitude of the MR readback signal $V_{MR}'$ can be decreased. Conversely, if the output $V_{TS}$ of the thermal sensor 270 indicates a temperature increase, the amplitude of the MR readback signal $V_{MR}'$ can be increased.

In an alternate embodiment, the thermal sensor can share an MR lead to reduce the number of pads on the head.

Another embodiment of the present invention generates a correction algorithm based on the output $V_{TS}$ of the thermal sensor and a correction factor $\xi$. One illustrative correction algorithm is given by Equation 1.

$$\xi \cdot V_{MR} \rightarrow V_{MR}'$$

Equation 1 where $V_{MR}$ is the MR readback signal voltage, and $V_{MR}'$ is the adjusted MR readback signal voltage.

One illustrative correction factor $\xi$ is as follows.

$$\xi = (1 + \alpha \cdot V_{TS})$$

Equation 2 where $\alpha$ is a variable or constant, and $V_{TS}$ is the voltage of the thermal detector.

Figure 11:
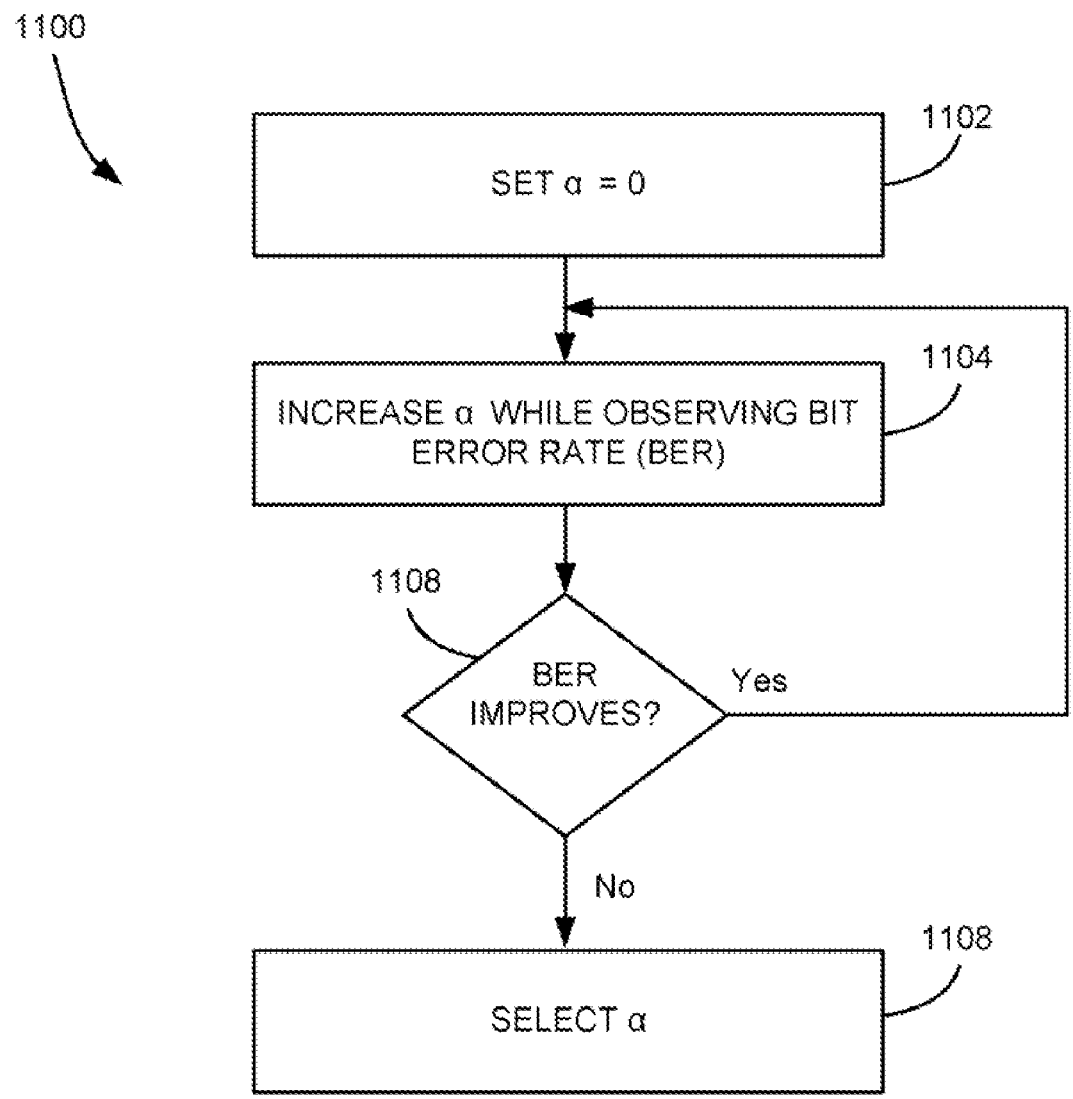
FIG. 11 is a position diagram of a procedure for selecting a correction value according to one embodiment of the present invention.

The value for $\alpha$ can be predefined. The value for $\alpha$ can also be selected and/or calibrated based on the Bit Error Rate (BER), which indicates the number of bits between errors. FIG. 11 depicts a procedure 1100 for selecting a value for $\alpha$ using Equations 1 and 2. In operations 1102, $\alpha$ is set to 0. In operation 1104, $\alpha$ is slowly increased (continuously or in steps) and the BER is observed to correlate the effect of $\alpha$ on the BER. At decision 1106, if the BER improves, $\alpha$ is raised again. At a certain value for $\alpha$, the BER will begin to degrade rapidly towards zero. In operation 1108, $\alpha$ is selected. A value for $\alpha$ can be selected that provides the most desirable BER, based on the observed results of operation 1104. This procedure 1100 can be periodically performed to calibrate $\alpha$, with $\alpha$ beginning at 0 or some other value.

In a further embodiment, the readback signal is not adjusted, but rather readback signal processing is altered based on an output of the thermal sensor. For example, a correction factor can be applied to the PRML thresholds based on whether a higher- or lower-than-normal readback signal is expected.

The correction provided by the thermal sensor system can be always on, dynamically applied, etc. In other words, the correction may be on part of the time and off part of the time. The correction can be reduced or turned off if it is not working well with a particular tape. For example, if errors are detected during readback, $\alpha$ can be reduced or even set to zero (correction is off when $\alpha=0$).

Another method for calibrating the correction algorithm or portion thereof (e.g., $\alpha$), uses data set separator patterns. Data set separator patterns are written on each data track of a magnetic recording tape to identify breaks between sets of data. Because the data set separator will have a predictable data pattern, the system can determine whether the amplitude adjustments are helping by analyzing the quality of the readback signal of the data set separator. If the correction is not operating properly, adjustment of the readback signal can be turned off for good, until the next data set separator, etc. In another embodiment, the correction is turned off during reading of every other, every tenth, etc. data set separator pattern, and the readback signal is compared to a cached version thereof from a previous read with correction on.

The foregoing systems and methods enable improved PRML detection by at least partially correcting the amplitude response during readback. The inventor estimates that up to about a 10× the component of reduction in error rate due to tape surface irregularities is achievable. Embodiments of the present invention can also be used to assist peak detection.

In a similar vein, the write signal, i.e., write current, sent to the head can be altered based on an output of the thermal sensor. It is well known in magnetic recording that the optimum write current depends on the magnetic characteristics of the medium, including the magnetic medium thickness, magnetic particle density, etc. The optimum write signal is achieved when the magnetic flux "write bubble" fully penetrates the media but is not so large as to cause distortion of the transition walls.

Accordingly, in one embodiment, a processor determines whether the write current should be changed to adapt the size of the bubble, and therefore the write current, to match the medium.

Such processing can be based on the algorithm. The algorithm can be based on an analysis of the writing process particularly in regions of the tape which show a particular thermal response. For example, a method to determine the algorithm can include the following steps:

1. find the relationship between write current and head/tape spacing, for example, by finding the optimum write current at various head/tape spacings, to generate calibration data,
2. determine the response of the thermal sensor at various head/tape spacings,
3. run the tape and detect a thermal event and from the response of the thermal sensor determine the effective tape/head spacing,
4. use the calibration data derived from step 1 to adjust the write current based on the effective tape/head spacing in step 3.

Those skilled in the art will appreciate that a plethora of ways to adjust the write current based on an output of a thermal sensor are possible, and so the invention is not to be limited to the embodiments presented herein.

Figure 12:
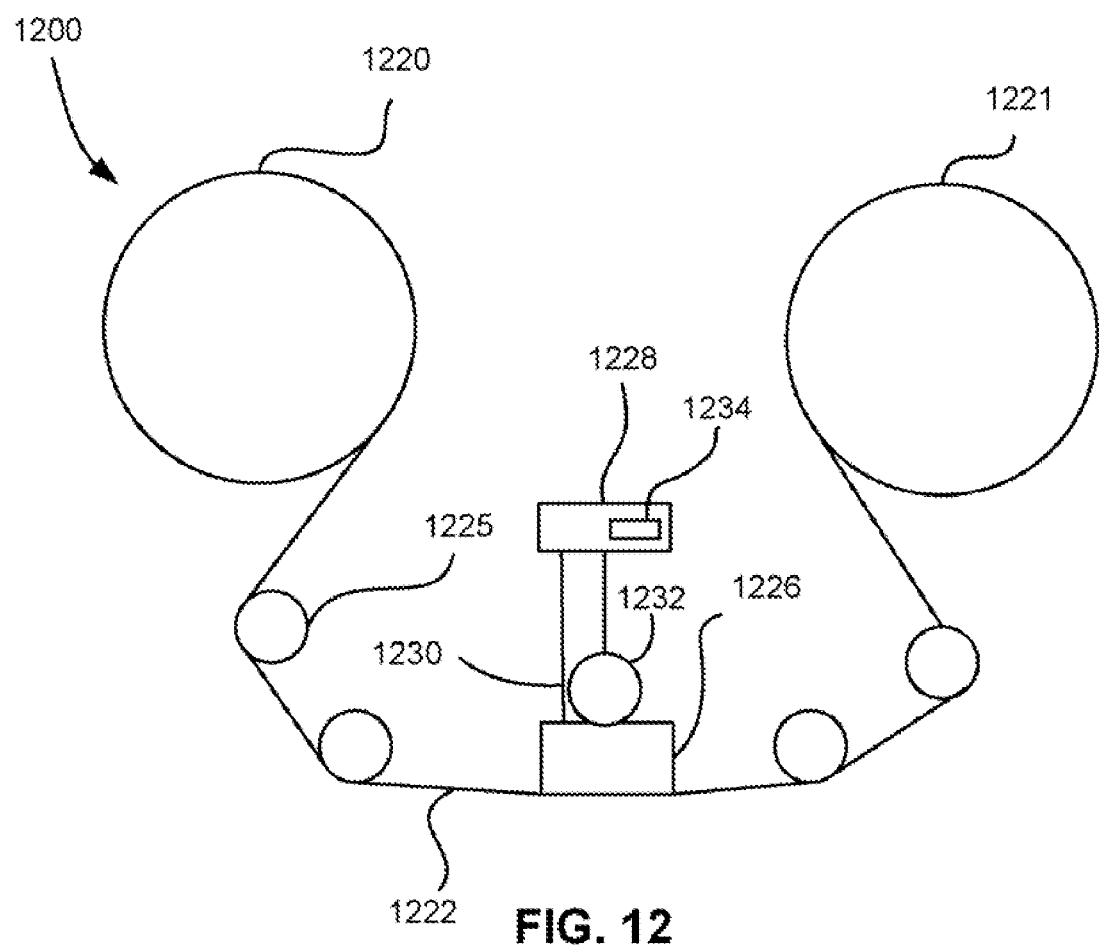
FIG. 12 is a schematic diagram of a tape drive system.

FIG. 12 illustrates a simplified tape drive which may be employed in the context of the present invention. While one specific implementation of a tape drive is shown in FIG. 12, it should be noted that the embodiments of the previous figures may be implemented in the context of any type of tape drive system.

As shown, a tape supply cartridge 1220 and a take-up reel 1221 are provided to support a tape 1222. These may form part of a removable cassette and are not necessarily part of the system. Guides 1225 guide the tape 1222 across a preferably bidirectional tape head 1226, of the type disclosed herein. Such tape head 1226 is in turn coupled to a controller 1228 via a write-read cable 1230. The controller 1228, in turn, controls head functions such as servo following, writing, reading, etc. An actuator 1232 controls position of the head 1226 relative to the tape 1222. The controller 1228 may include a processor 1234 such as an ASIC, microprocessor, CPU, etc. for performing any of the functions described herein.

A tape drive, such as that illustrated in FIG. 12, includes drive motor(s) to drive the tape supply cartridge 1220 and the take-up reel 1221 to move the tape 1222 linearly over the head 1226. The tape drive also includes a read/write channel to transmit data to the head 1226 to be recorded on the tape 1222 and to receive data read by the head 1226 from the tape 1222. An interface is also provided for communication between the tape drive and a host (integral or external) to send and receive the data and for controlling the operation of the tape drive and communicating the status of the tape drive to the host, all as will be understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tape drive system, comprising:
   a magnetic head for reading data from a magnetic tape;
   a thermal sensor for detecting a thermal effect thereon from the tape passing by the thermal sensor;
   a drive mechanism for passing the tape over the head; and a processor for performing at least one of the following actions:
  causing alteration of a readback signal from the magnetic head based on an output of the thermal sensor, and
  altering processing of a readback signal from the magnetic head based on an output of the thermal sensor,
wherein the processor causes adjustment of an amplitude of the readback signal from the magnetic head based on the output of the thermal sensor.

2. The system as recited in claim 1, wherein the thermal sensor is heated to a temperature greater than a nominal operating temperature of the sensor.

3. The system as recited in claim 1, wherein the thermal sensor is integral to the magnetic head.

4. The system as recited in claim 1, wherein the thermal sensor has been formed independently of the magnetic head.

5. The system as recited in claim 1, wherein the head includes an array of readers and an array of thermal sensors, each of the thermal sensors being aligned with one of the readers in a tape travel direction.

6. The system as recited in claim 1, wherein the system uses Partial Response Maximum Likelihood (PRML) detection to identify magnetic transitions on the tape based on the readback signal from the magnetic head.

7. The system as recited in claim 1, wherein the thermal sensor is heated to a temperature greater than a nominal operating temperature of the sensor by at least one of a heating element and joule heating induced as a byproduct of the sensing current passing through the thermal sensor.

8. The system as recited in claim 1, wherein the head includes an MR sensor, wherein the MR sensor and the thermal sensor share a pad on the head.

9. A tape drive system, comprising:
  a magnetic head for reading data from a magnetic tape;
  a thermal sensor for detecting a thermal effect thereon from the tape passing by the thermal sensor;
  a drive mechanism for passing the tape over the head: and
  a processor for performing at least one of the following actions:
    causing alteration of a readback signal from the magnetic head based on an output of the thermal sensor, and
    altering processing of a readback signal from the magnetic head based on an output of the thermal sensor,
  wherein the processor computes a correction factor based on the output of the thermal sensor, and uses the correction factor to adjust the readback signal from the magnetic head.

10. The system as recited in claim 9, wherein the correction factor is calculated according to the following formula:

$$\text{correction factor} = (1 + \alpha \cdot V_{TS}),$$

where $\alpha$ is a variable, and
$V_{TS}$ is a voltage of the thermal sensor.

11. The system as recited in claim 10, wherein the processor selects $\alpha$ based on a bit error rate during a tape read operation.

12. The system as recited in claim 10, wherein the processor calibrates a based on a bit error rate.

13. The system as recited in claim 9, wherein the thermal sensor is heated to a temperature greater than a nominal operating temperature of the sensor.

14. The system as recited in claim 9, wherein the thermal sensor is integral to the magnetic head.

15. The system as recited in claim 9, wherein the thermal sensor has been formed independently of the magnetic head.

16. The system as recited in claim 9, wherein the head includes an array of readers and an array of thermal sensors, each of the thermal sensors being aligned with one of the readers in a tape travel direction.

17. The system as recited in claim 9, wherein the system uses Partial Response Maximum Likelihood (PRML) detection to identify magnetic transitions on the tape based on the readback signal from the magnetic head.

18. The system as recited in claim 9, wherein the thermal sensor is heated to a temperature greater than a nominal operating temperature of the sensor by at least one of a heating element and joule heating induced as a byproduct of the sensing current passing through the thermal sensor.

19. The system as recited in claim 9, wherein the head includes an MR sensor, wherein the MR sensor and the thermal sensor share a pad on the head.

20. A tape drive system, comprising:
  a magnetic head for writing data to a magnetic tape;
  a thermal sensor for detecting a thermal effect thereon from a magnetic tape passing by the thermal sensor;
  a drive mechanism for passing the tape over the head; and
  a processor for altering a write signal sent to the magnetic head based on an output of the thermal sensor,
  wherein the system is adapted to determine an effective tape/head spacing based on the output of the thermal sensor,
  wherein the processor is adapted to alter the write signal based on the determined effective tape/head spacing.

* * * * *